H. Y. NORWOOD.
TEMPERATURE INDICATING MECHANISM.
APPLICATION FILED FEB. 3, 1915.
1,186,934.
Patented June 13, 1916.
2 SHEETS—SHEET 1.
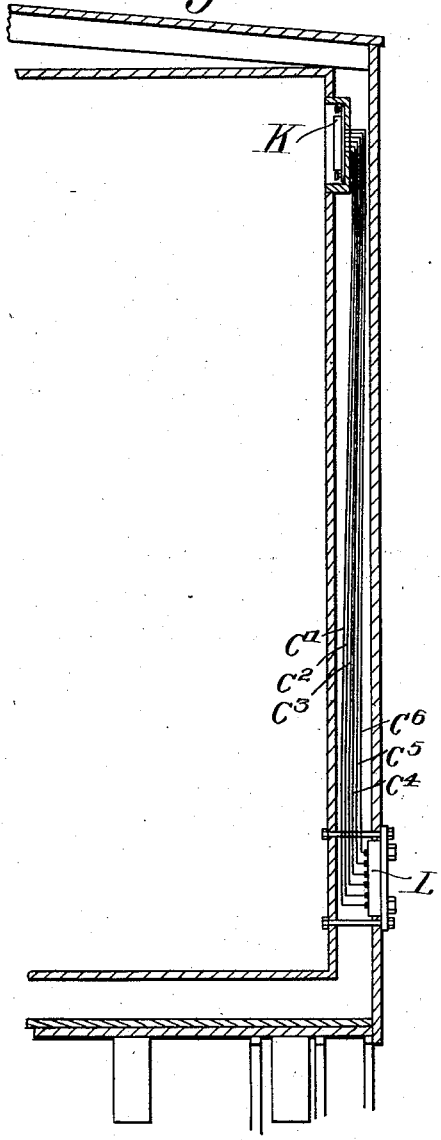
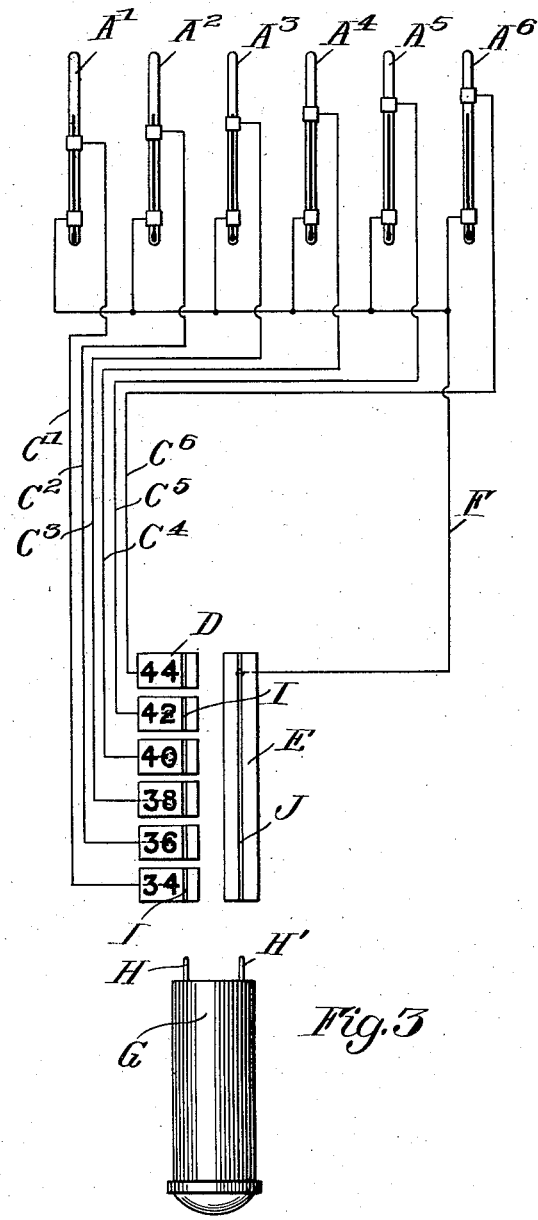
WITNESSES:
H. E. Stonebraker
Nelson H. Copp
INVENTOR
Harry Y. Norwood
BY
his ATTORNEYS H. Y. NORWOOD.
TEMPERATURE INDICATING MECHANISM.
APPLICATION FILED FEB. 3, 1915.
1,186,934.
Patented June 13, 1916.
2 SHEETS—SHEET 2.
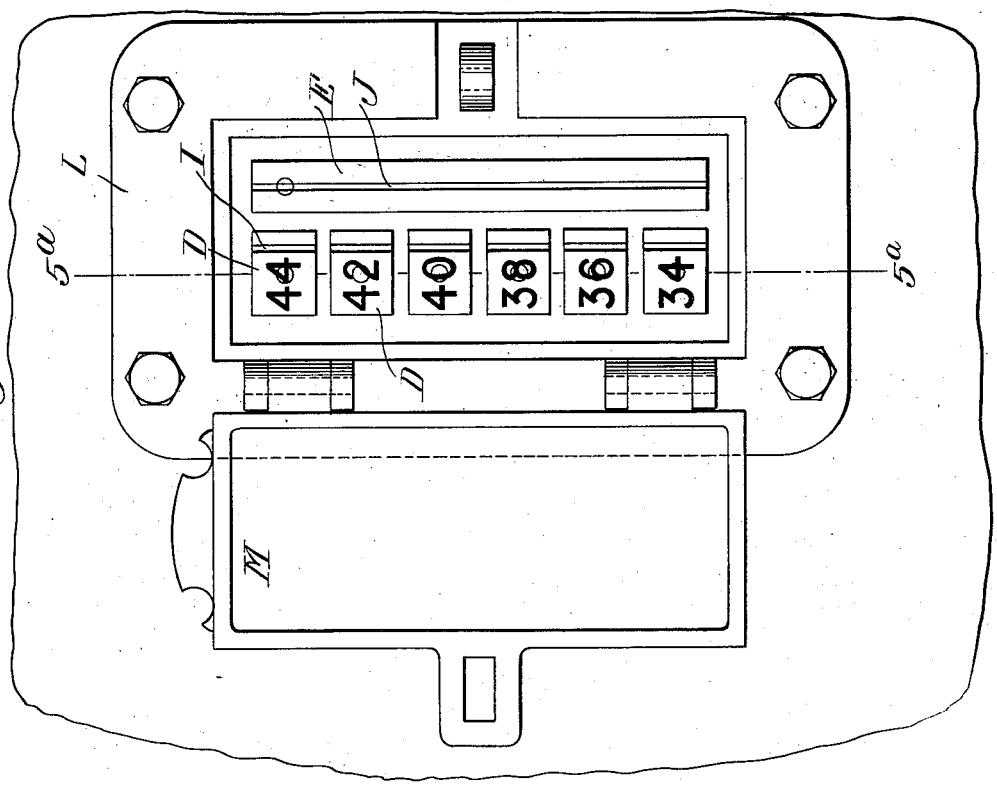
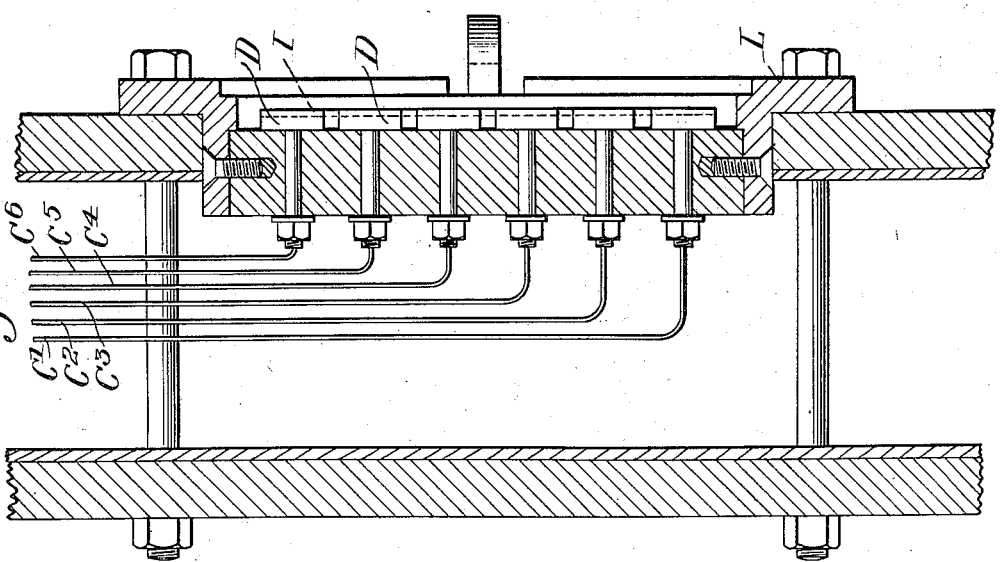
WITNESSES:
H E Stonebraker
Nelson H. Copp
INVENTOR
Harry Y. Norwood
BY
Church & Rich
his ATTORNEYS

UNITED STATES PATENT OFFICE.

HARRY Y. NORWOOD, OF ROCHESTER, NEW YORK, ASSIGNOR TO TAYLOR INSTRUMENT COMPANIES, OF ROCHESTER, NEW YORK, A CORPORATION OF NEW YORK.

TEMPERATURE-INDICATING MECHANISM.

1,186,934.     Specification of Letters Patent.     Patented June 13, 1916.

Application filed February 3, 1915. Serial No. 5,853.

*To all whom it may concern:*

Be it known that I, HARRY Y. NORWOOD, of Rochester, in the county of Monroe and State of New York, have invented certain new and useful Improvements in Temperature-Indicating Mechanisms; and I do hereby declare the following to be a full, clear, and exact description of the same, reference being had to the accompanying drawings, forming a part of this specification, and to the reference-numerals marked thereon.

My invention relates to a temperature indicating mechanism, and it has for its chief object to provide a distance reading apparatus whereby information may be had at a central station or point concerning temperatures at some remote place.

More particularly, the invention comprises a mechanism that is especially applicable to refrigerator cars, and in similar relations, where it may be desired to ascertain the temperature at a point inside the car or inclosure without entering it, and the invention also embraces structure whereby the desired reading can be quickly and readily obtained in the dark.

To these and other ends the invention consists in certain improvements and combinations of parts all as will be hereinafter more fully described, the novel features being pointed out in the claims at the end of the specification.

In the drawings: Figure 1 is a sectional view showing the application of my invention to a car; Fig. 2 is a diagrammatic illustration of the arrangement of thermometers and circuits; Fig. 3 is a detail elevation of the circuit closing indicator in the form in which I prefer to use it; Fig. 4 is a view in elevation of the contact box with the door open, and Fig. 5 is a sectional view taken on the line $5^a$—$5^a$ of Fig. 4.

Similar reference characters in the several figures indicate the same parts.

In the embodiment shown, there is employed a series of thermometers, indicated at $A^1$, $A^2$, $A^3$, $A^4$, $A^5$, $A^6$ arranged in the circuits $C^1$, $C^2$, $C^3$, $C^4$, $C^5$, and $C^6$ respectively. Each thermometer is provided with a contact, so arranged with reference to the mercury column as to close the circuit when the temperature reaches a predetermined point, the several thermometers being constructed to close their circuits at different temperatures ranging for instance from 34° to 44°, at intervals of two degrees each. Each thermometer circuit includes a contact plate, as shown at D, and E designates a common contact plate which is connected in series with each of the circuits through a conductor F. If a circuit is completed between the contact plate E and the contact plates D successively, by some form of circuit closing indicator, an indication will be had from the particular circuit or circuits that have been closed by a rise of temperature.

The indicator which I prefer to employ consists of a lamp G, the circuit of which includes a suitable dry cell and the contact points or pins H, H'. In order to maintain the contact pins in proper relation with the contact plates when a reading is taken, I provide the contact plates with guiding means adapted to coöperate with the contact pins. The guiding means consists preferably of grooves I formed on the contact plates D in the manner shown, and constituting a substantially straight groove extending parallel to the groove J, which is arranged longitudinally of the contact plate E. The grooves J and I are spaced apart the same distance as the pins H, H', and by inserting the pins in the grooves at the top of the plate E, the indicating member can readily be moved back and forth over the contact plates D, to determine which circuits are closed, connection being constantly maintained with the plate E while taking the reading. With the parts arranged in this manner, if the temperature has reached 40° circuits $A^1$, $A^2$, $A^3$ and $A^4$ are closed, and when the contact pins of the indicating lamp are brought into engagement with the contact plates, the lamp circuit will be closed when the pins engage any of the corresponding contact plates, whereas when they engage the remaining contact plates, no indication will be given, showing that the temperature has not reached a point as high as 42°. The indicator G is a portable device and can be conveniently carried by the person in charge, so that readings can quickly be taken at any number of different stations. The particular advantage of this construction lies in its use in such applications as refrigerator cars, whereby it is possible to inspect the cars at night, when they may be lying in freight yards, and determine the interior temperatures from the outside of the car. Furthermore, in case one of the thermometers becomes broken, it does not destroy the entire effectiveness of the mechanism, as readings may still be taken from the remaining instruments.

The thermometers may be arranged in a housing K at any desired point in the car, while L designates a box or casing secured in an outside recess in a wall of the car and inclosing the contact plates already referred to. The latter are protected within the box L by a door or cover M which may be kept and locked except when a reading is to be taken, at which time the inspector or authorized person can open the door and have access to the contact plates.

I claim as my invention:

1. In a temperature indicating mechanism, the combination with a plurality of thermometers, each included in an independent electric circuit and operating to close its circuit at a predetermined temperature, of portable indicating means adapted to be selectively operated by the closing of any of said circuits.

2. In a temperature indicating mechanism, the combination with a plurality of electric circuits each of which is closed at a predetermined temperature, of a contact plate for each circuit having guiding means on its surface, a contact plate common to all of said circuits and embodying a bar arranged in spaced relation to the first mentioned contact plates, the bar having guiding means on its surface, and a portable circuit closing indicator provided with a pair of contacts for engagement with said contact plates, the contacts coöperating with the guiding means on the contact plates.

3. In a temperature indicating mechanism, the combination with a plurality of electric circuits each of which is closed at a predetermined temperature, of a contact plate for each circuit having a guiding groove extending across it, a contact plate common to all of said circuits and embodying a bar arranged in spaced relation to the first mentioned contact plates, said bar having a longitudinally arranged guiding groove, and a portable circuit closing indicator for coöperation with the contact plates, said indicator being provided with a pair of contact pins which coöperate with said guiding grooves.

4. In a temperature indicating mechanism, the combination with a plurality of thermometers, each included in an independent circuit and operating to close its circuit at a predetermined temperature, a contact plate for each circuit having a guiding groove extending across it, a contact plate common to all of said circuits and embodying a bar arranged in spaced relation to the first mentioned contact plates, said bar having a longitudinally arranged guiding groove, and a portable circuit closing indicator for coöperation with the contact plates, said indicator being provided with a pair of contact pins which coöperate with said guiding grooves.

HARRY Y. NORWOOD.

Witnesses:
H. E. STONEBRAKER,
RUSSELL B. GRIFFITH.